United States Patent
Witt, Jr. et al.

(10) Patent No.: US 9,789,838 B1
(45) Date of Patent: Oct. 17, 2017

(54) AIRBAG COVER WEAKENING PATTERNS AND RELATED SYSTEMS AND METHODS

(71) Applicant: Autoliv ASP, Inc., Ogden, UT (US)

(72) Inventors: John F. Witt, Jr., Clinton Township, MI (US); David W. Schneider, Waterford, MI (US); Jan Pontus Söderström, Rochester, MI (US); Uriel Hernandez Padilla, Lake Orion, MI (US)

(73) Assignee: AUTOLIV ASP, INC., Ogden, UT (US)

( * ) Notice: Subject to any disclaimer, the term of this patent is extended or adjusted under 35 U.S.C. 154(b) by 0 days.

(21) Appl. No.: 15/090,517

(22) Filed: Apr. 4, 2016

(51) Int. Cl.
*B60R 21/216* (2011.01)
*B60R 21/2165* (2011.01)

(52) U.S. Cl.
CPC *B60R 21/2165* (2013.01); *B60R 2021/21652* (2013.01)

(58) Field of Classification Search
CPC .................. B60R 21/2165; B60R 2021/21652
See application file for complete search history.

(56) References Cited

U.S. PATENT DOCUMENTS

| | | | | |
|---|---|---|---|---|
| 5,421,610 A | * | 6/1995 | Kavanaugh | B60R 21/2342 188/376 |
| 5,961,143 A | * | 10/1999 | Hlywka | B29C 59/007 280/728.3 |
| 6,224,090 B1 | | 5/2001 | Lutze et al. | |
| 6,247,722 B1 | * | 6/2001 | Brodi, Jr. | B29C 45/16 280/728.3 |
| 6,837,515 B2 | | 1/2005 | Yaldir | |
| 7,014,209 B2 | | 3/2006 | Muller et al. | |
| 7,497,463 B2 | * | 3/2009 | Kaulbersch | B26F 1/24 280/728.3 |
| 2002/0078814 A1 | * | 6/2002 | Kansteiner | B26D 3/065 83/875 |
| 2004/0160043 A1 | * | 8/2004 | Litjens | B29C 43/021 280/732 |

(Continued)

FOREIGN PATENT DOCUMENTS

| | | |
|---|---|---|
| CN | 103183000 | 7/2013 |
| DE | 19636428 | 3/1998 |

(Continued)

OTHER PUBLICATIONS

KR20130079927—Machine Translation of Application.

(Continued)

*Primary Examiner* — Darlene P Condra
(74) *Attorney, Agent, or Firm* — Phillips Ryther & Winchester; Matthew D. Thayne

(57) ABSTRACT

Airbag cushion covers and related methods. Some embodiments may comprise an airbag cover comprising a weakened pattern configured to facilitate separation of the cover during deployment of an airbag cushion. The weakened region may comprise a first tear seam comprising a first shape defined by a first line comprising at least one of regions of curvature and angled regions, and a second tear seam comprising a second shape defined by a second line comprising at least one of regions of curvature and angled regions. In some embodiments, the first shape may comprise, or at least substantially comprise, a reflected image of the second shape.

12 Claims, 4 Drawing Sheets

(56) References Cited

U.S. PATENT DOCUMENTS

| | | | | |
|---|---|---|---|---|
| 2004/0164531 A1* | 8/2004 | Riha | ................ | B29C 59/16 |
| | | | | 280/732 |
| 2005/0001410 A1* | 1/2005 | Evans | ................ | B60R 21/2165 |
| | | | | 280/728.3 |
| 2006/0119136 A1* | 6/2006 | Trombley | ................ | B60R 21/04 |
| | | | | 296/187.03 |
| 2012/0038133 A1* | 2/2012 | Kalisz | ................ | B29C 33/42 |
| | | | | 280/728.3 |
| 2013/0065041 A1* | 3/2013 | Wisniewski | ................ | B60R 21/2165 |
| | | | | 428/304.4 |
| 2013/0270801 A1* | 10/2013 | Zhang | ................ | B60R 21/2165 |
| | | | | 280/728.3 |
| 2015/0298641 A1* | 10/2015 | Barr | ................ | B26F 1/24 |
| | | | | 280/728.3 |

FOREIGN PATENT DOCUMENTS

| | | |
|---|---|---|
| DE | 102012214909 B3 | 1/2014 |
| EP | 1750978 B1 | 1/2008 |
| KR | 20130079927 | 7/2013 |

OTHER PUBLICATIONS

EP1750978B1—Machine Translation of Application.
DE102012214909B3—Machine Translation of Application.
CN103183000—Machine Translation of Application.
DE19636428—Machine Translation of Application.

\* cited by examiner

AIRBAG COVER WEAKENING PATTERNS AND RELATED SYSTEMS AND METHODS

SUMMARY

Airbag cushions are often wrapped in covers, in some cases leather covers, to hide the airbag cushion and provide a more aesthetically pleasing appearance to a vehicle's interior. Such covers are typically provided with tear seams to facilitate exit of the airbag cushion from the cover during deployment. Such tear seams are often created using a needle to perforate the leather/cover or a LASER to create a bore though a substrate of the cover and a portion of the thickness of the top layer of the cover. These processes, however, are often very slow and time consuming. In addition, they can be difficult to precisely control and often result in poor appearance of the cover ("read through"). In addition, the patterns provided by the prior art are often not ideal for creating desired breakthrough/deployment characteristics.

The present inventors have therefore determined that it would be desirable to provide apparatus, assemblies, and methods that overcome one or more of the foregoing limitations and/or other limitations of the prior art. For example, the present inventors have determined that, by providing, in some embodiments, airbag covers having particular weakening patterns configured to improve upon deployment characteristics and/or improve the appearance of the cover, (such as by reducing read through), the above-referenced limitations, and/or other limitations of the prior art, may be avoided or improved upon.

In a more particular example of an embodiment of a cover for an airbag cushion, the cover may comprise a weakened region configured to facilitate separation of the cover during deployment of an airbag cushion. The weakened region may comprise a first tear seam comprising a first shape defined by a first line comprising at least one of regions of curvature and angled regions; and a second tear seam comprising a second shape defined by a second line comprising at least one of regions of curvature and angled regions. In some embodiments, the first shape may comprise, or may at least substantially comprise, a reflected image of the second shape.

In some embodiments, the first shape may comprise a shifted, reflected image of the second shape. In other embodiments, the first shape may comprise an unshifted, reflected image of the second shape such that the first shape has reflectional symmetry with respect to the second shape. In some such embodiments, the first shape may have reflectional symmetry with respect to the second shape about a line of symmetry defined by another tear seam. For example, in some embodiments, the cover may further comprise a substrate. In some such embodiments, the substrate may comprise a substrate tear seam. In some such embodiments, the first shape may have reflectional symmetry with respect to the second shape about a line of symmetry defined by the substrate tear seam.

In some embodiments, the first line and/or the second line may lack any sharp angles. For example, in some preferred embodiments, the first shape may comprise a first sinusoidal wave pattern, and the second shape may comprise a second sinusoidal wave pattern reflected with respect to the first sinusoidal wave pattern. Thus, the weakened pattern may comprise a dual sinusoidal shape.

In some embodiments, a radius of curvature of the first line may vary within the first shape, and/or a radius of curvature of the second line may vary within the second shape. In some embodiments, other features of the pattern may vary throughout the pattern, such as, for example, the depth of the cut, the profile/amplitude of the pattern, the wavelength of one or more tear seams (such as in patterns comprising sinusoids), etc. In some embodiments, a radius of curvature of the first line may be at least 0.5 mm along an entire length of the first line. Similarly, in some embodiments, a radius of curvature of the second line may also, or alternatively, be at least 0.5 mm along an entire length of the second line.

In some embodiments, the cover may comprise a leather material. In some such embodiments, the weakened region may be formed in the leather material. In some such embodiments, the weakened region may also be formed in another layer/portion of the cover. For example, in some embodiments, the cover may further comprise a substrate positioned adjacent to the leather material. In some such embodiments, the weakened region may be further formed in the substrate.

In a particular example of a method for manufacturing an airbag cushion cover according to some implementations, the method may comprise obtaining a first layer of an airbag cushion cover and forming a first weakened pattern in the first layer such that the first weakened pattern facilitates separation of the first layer to allow for deployment of an airbag cushion therethrough. The first weakened pattern may comprise a first shape. A second weakened pattern may also be formed in the first layer such that the second weakened pattern further facilitates separation of the first layer to allow for deployment of an airbag cushion therethrough. In some implementations, the second weakened pattern may comprise a second shape comprising a reflected image of the first shape.

For example, the first shape may comprise a first sinusoidal wave pattern, and the second shape comprises a second sinusoidal wave pattern. In some implementations, the first sinusoidal wave pattern may have reflectional symmetry with respect to the second shape about a line of symmetry.

Some implementations may further comprise coupling a second layer of the airbag cushion cover to the first layer and forming a tear seam in the second layer. In some such implementations, the tear seam may be positioned in between the first weakened pattern and the second weakened pattern. In some implementations, the line of symmetry may coincide, or at least substantially coincide, with the tear seam.

In another example of a method for manufacturing an airbag cushion cover, the method may comprise forming a first tear seam in a first layer of the airbag cushion cover and forming a second tear seam in a second layer of the airbag cushion cover. One or both of the tear seams may be formed using a vibrating knife mechanism. In some implementations, a computerized numerical control machine comprising a vibratory knife may be used. In some implementations, the second tear seam (or in some implementations, all tear seams) may be formed continuously without withdrawal of the vibrating knife mechanism from the second layer. In some implementations, the second tear seam may be formed in a first shape comprising a varying radius of curvature.

In some implementations, a third tear seam may be formed in the second layer of the airbag cushion using the vibrating knife. In some such implementations, the third tear seam may be formed continuously without withdrawal of the vibrating knife mechanism from the second layer. In some such implementations, the third tear seam may be formed in a second shape comprising a varying radius of curvature.

In some implementations, the varying radius of curvature of the first shape and/or the second shape may be at least 0.5 mm along an entire length of the respective second and/or third tear seams.

In some implementations, a first blade of the vibrating knife mechanism may be used to form the second tear seam, and a second blade of the vibrating knife mechanism is used to form the third tear seam. Alternatively, both tear seams (and, in some implementations, additional tear seams) may be formed by the same blade.

In some implementations, the vibrating knife mechanism may comprise a computerized numerical control machine, which may be configured to allow for controlling the varying radius of curvatures of the second and third tear seams during application/formation of the various tear seams.

The features, structures, steps, or characteristics disclosed herein in connection with one embodiment may be combined in any suitable manner in one or more alternative embodiments and/or implementations.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

A detailed description of apparatus, systems, and methods consistent with various embodiments of the present disclosure is provided below. While several embodiments are described, it should be understood that the disclosure is not limited to any of the specific embodiments disclosed, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Apparatus, methods, and systems are disclosed herein relating to airbag weakening patterns, which in some preferred embodiments and implementations may be formed in airbag covers. More particularly, in some embodiments and implementations, various weakening patterns, such as tear seams defining particular shapes, may be formed and used in connection with airbag covers, such as leather-wrapped airbag covers, for example. Various implementations of methods for forming such weakening patterns are also disclosed herein. For example, in certain preferred implementations of such methods, a vibratory knife, such as a computer numerical controlled vibratory knife, may be used to apply a preferred weakening pattern.

The embodiments of the disclosure may be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the apparatus and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified. Additional details regarding certain preferred embodiments and implementations will now be described in greater detail with reference to the accompanying drawings.

Figure 1:
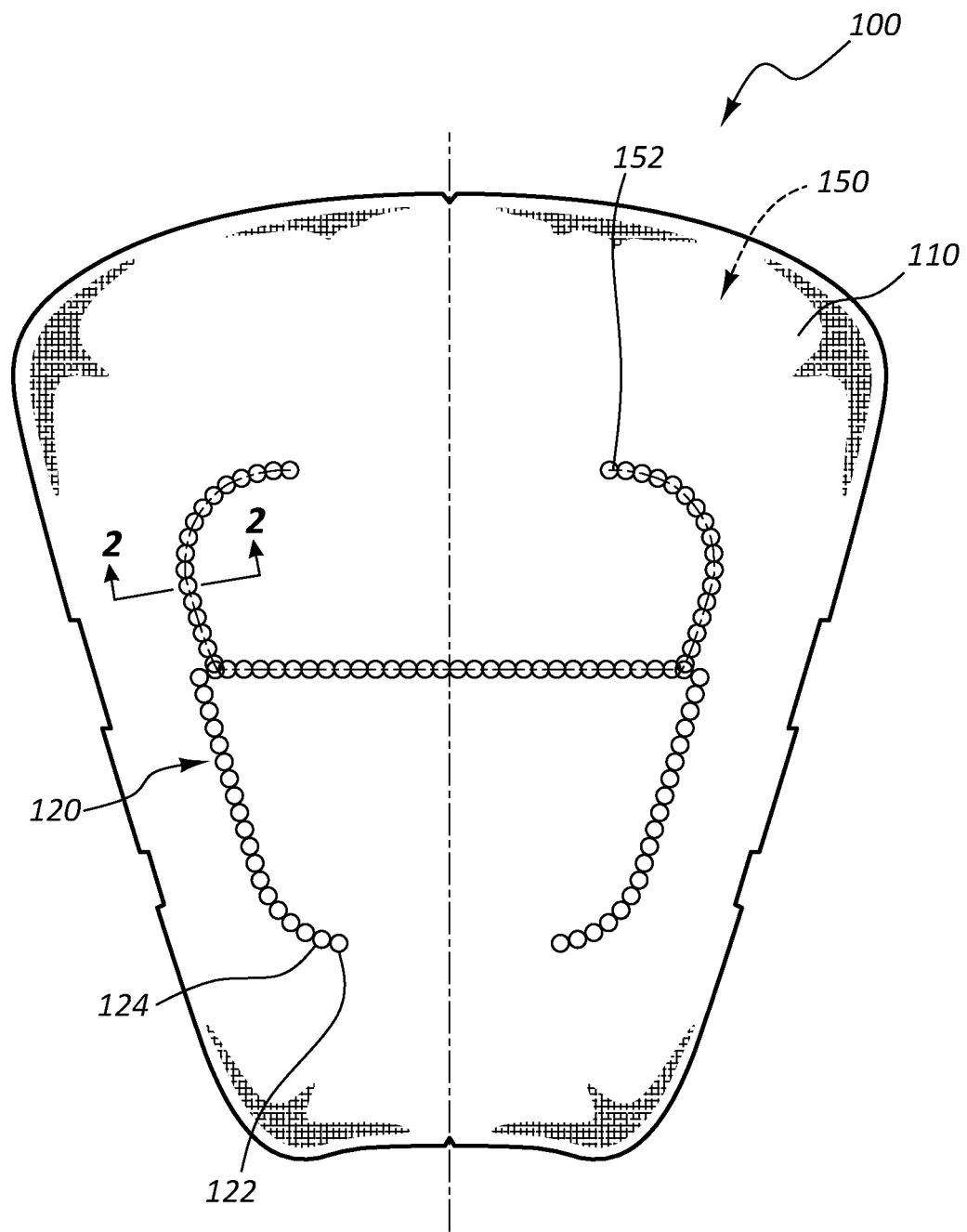
FIG. 1 depicts an airbag cover according to a preferred embodiment.

FIG. 1 depicts an embodiment of an airbag cushion cover 100. Cover 100 may comprise a cover for an airbag cushion and may comprise a single layer or, alternatively, may comprise multiple layers. For example, in some embodiments, cover 100 may comprise a top layer 110 which may, in some embodiments, be made up of leather or another decorative material. A substrate 150 or second layer may be positioned adjacent to top layer 110. Substrate 150 may, but need not be, made up of a distinct material with respect to top layer 110. For example, in some embodiments, substrate 150 may comprise a thermoplastic material.

One or more weakened regions 120 may be positioned on/in cover 100, which may be configured to facilitate separation of cover 100 during deployment of an airbag cushion (not shown). Weakened region 120 may, in some embodiments, be made up of one or more tear seams, such as tear seams 122 and 124. In some embodiments, tear seams 122 and/or 124 may extend through, either fully or partially, multiple layers of cover 100, such as through layers 110 and 150. Alternatively, tear seams 122 and/or 124 may only extend through one layer of cover 100, such as top layer 110. In some embodiments, tear seams 122 and/or 124 may only partially extend through layer 110, or another layer of cover 100.

In some embodiments, weakened region 120 comprises tear seams defining a preferred shape that may facilitate separation of one or more layers of cover 100 in a desired manner. For example, in the embodiment depicted in FIG. 1, weakened region 120 may comprise a first tear seam 122 comprising a first shape and a second tear seam 124 comprising a second shape. These two shapes may be related to one another. For example, in the depicted embodiment, first tear seam 122 may be defined by and/or at least substantially track a first line defining a first shape and second tear seam 124 may be defined be and/or at least substantially track a second line defining a second shape that may be similar to the first shape. Thus, in some such embodiments, the first shape comprises a reflected image of the second shape. In some embodiments, the first shape may comprise a shifted, reflected image of the second shape. However, in the depicted embodiment, the first shape is an unshifted, reflected image of the second shape.

More particularly, in the specific example depicted in FIG. 1, first tear seam 122 defines a first sinusoidal wave pattern and second tear seam 124 defines a second sinusoidal wave pattern reflected with respect to the first sinusoidal wave pattern. In addition, in some embodiments, the two tear seams may collectively extend back and forth across another tear seam or other weakened region that may be formed in another layer of the cover 100. For example, in the depicted embodiment, a linear tear seam 152 is formed within substrate 150 and tear seams 122 and 124 extend back and forth across tear seam 152 along the pattern of weakened region 120. In some embodiments (including the embodiment of FIG. 1), tear seam 152 defines a line of symmetry such that the first shape defined by tear seam 122 has reflectional symmetry with respect to the second shape defined by tear seam 124 about the line of symmetry defined by the tear seam 152 formed within substrate 150. Although, in the embodiment of FIG. 1, tear seam 152 is shown as only extending about a portion of weakened region 120 (namely, the top portion of weakened region 120), in other embodiments, tear seam 152 may extend about the entire pattern of weakened region, or may extend about a different portion of weakened region 120 (such as the bottom portion of weakened region 120, for example).

Although certain preferred embodiments may comprise a line of symmetry defined by a tear seam 152 formed within a substrate 150 or another portion of cover 100, it should be understood that, because the weakening patterns disclosed herein may improve certain desired separation/deployment characteristics, it may not be as important that the weakening pattern in the top layer 110 closely track a weakening pattern in another layer, such as tear seam 152 in substrate 150. Thus, some embodiments are contemplated in which tear seam 152 need not define a line of symmetry, and/or in which tear seam 152 may only loosely track weakening pattern 120 or be absent altogether.

The various weakening patterns disclosed herein may be particularly suitable for preferred manufacturing methods involving use of vibratory knifes, such as continuously-contacting vibratory, computer numerical control knife systems. This may allow for relatively precise control over dimensions in one or more directions (x, y, and z) from the "A" surface of the cover (i.e., the surface of the cover that a vehicle passenger would typically see and/or be closest to while in the vehicle). For example, in some embodiments and implementations, use of such cutting means may allow for maintaining desired radii of curvature along the weakened region in a very controlled manner. For example, because smaller radii of curvature tend to increase read through of the material, in some embodiments it may be desired to maintain a radius of curvature of one or more lines associated with the weakened region of at least 0.5 mm along the entire length of each such line. In other embodiments, such as, for example, those in which read through may not be as big of a concern, it may be desirable to maintain smaller radii of curvature.

In some implementations of manufacturing methods, a double-sinusoidal or other desired pattern (such as connecting geometric shapes, for example) may be applied in which the blade remains in contact with the cover, such as the leather and/or top layer 110 during the entire application of the pattern, or at least during the application of one tear seam of the pattern. This may be useful for a number of different reasons, such as increasing cutting speed and controlling movement of the leather/layer/cover. This may also allow for greater process flexibility in alignment of the tear seams of the various layers of the cover, such as tear seam 152 with tear seams 122/124. In addition, this may allow for continuous radius changes to be made during the cutting process, which may allow for infinite, or near infinite, design variability on alignment of substrate tear seam to leather/top layer tear seam to promote propagation during airbag deployment.

Figure 2:
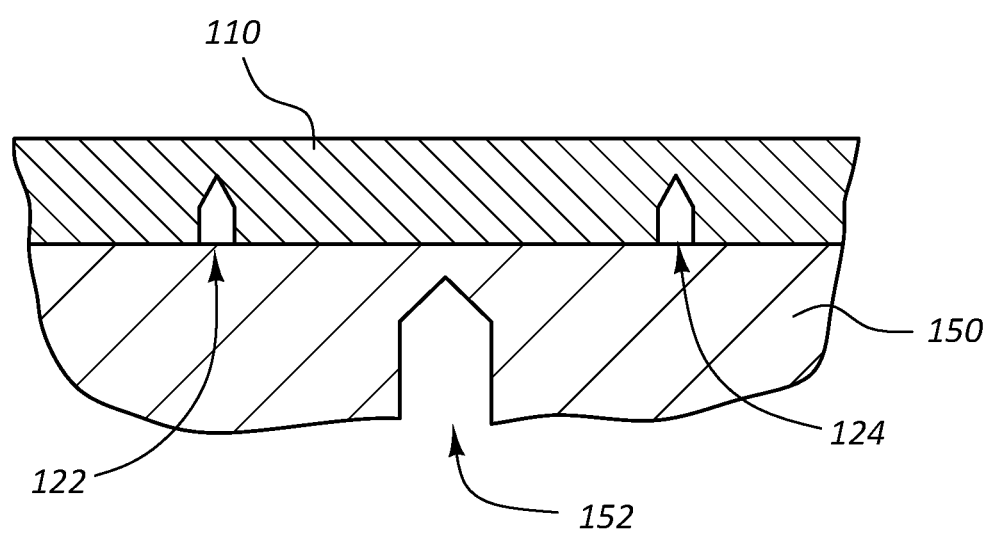
FIG. 2 is a cross-sectional view taken along line 2-2 in FIG. 1.

FIG. 2 is a cross-sectional view taken along line 2-2 in FIG. 1. As depicted in this figure, weakened region 120, which is made up of tear seams 122 and 124, may only be applied to layer 110, whereas tear seam 152 may only be applied to substrate 150. Thus, in certain implementations of methods used to manufacture cover 100, a vibratory knife or other cutting means may be used to apply the pattern of weakened region 120 to layer 110 prior to coupling layer 110 to substrate 150. Alternatively, a vibratory knife or other cutting means may be applied after the two layers (or, in other embodiments, any number of layers) have been coupled together. Thus, in some such embodiments and/or implementations, a weakened region comprising one or more tear seams may be applied in which the tear seams fully extend through one or more layers of the cover, such as top layer 110, and only partially extend through one or more other layers of the cover, such as substrate 150. In addition, although it may be preferable for certain applications to create continuous tear seams, alternative embodiments are contemplated in which one or more tear seams of one or more weakened regions may comprise partial or broken tear seams.

In some embodiments and/or implementations, the cutting depth and/or length of the various cuts may be varied in different parts of one or more of the tear seams as desired to create different tear seam thickness and/or bridges. However, in certain embodiments, it may be preferred that the cutting depth never extend all of the way through the leather or other material making up the top layer 110 of the cover 100, such that the appearance of the weakening pattern 120 is not visible on the surface of the top layer 110 (the "A" surface).

Figure 3:
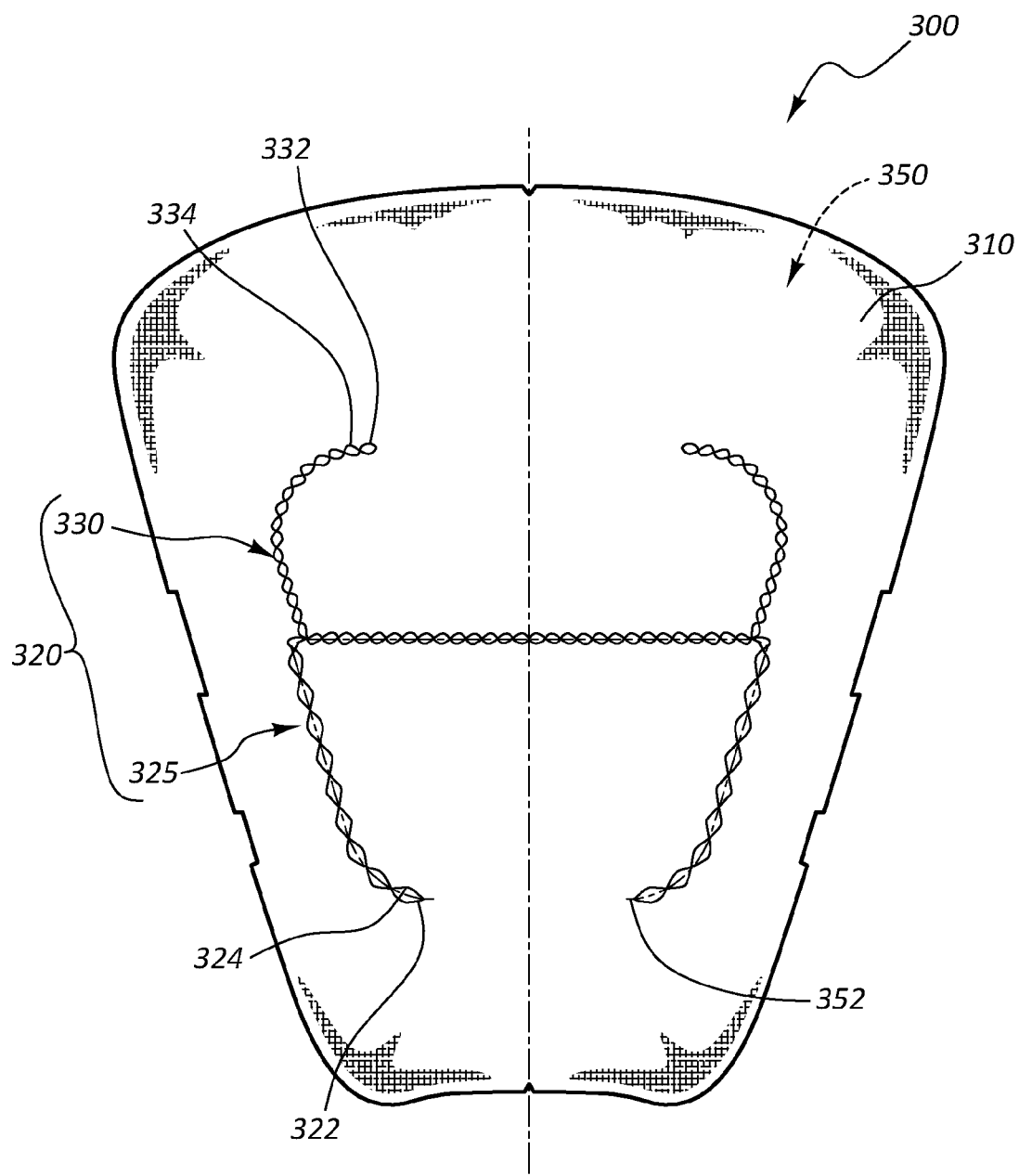
FIG. 3 depicts an alternative embodiment of an airbag cover.

FIG. 3 depicts an alternative embodiment of an airbag cushion cover 300. Like cover 100, cover 300 comprises a top layer 310 positioned on a substrate 350. Again, a weakened region 320 is formed within layer 310. However, unlike weakened region 120, weakened region 320 comprises a bottom portion 325 made up of a first pattern and a top portion 330 made up of a second pattern. Bottom portion 325 of weakened region 320 comprises tear seams 322 and 324 and top portion 330 of weakened region 320 comprises tear seams 332 and 334.

Both top portion 330 and bottom portion 325 of weakened region 320 comprise double-sinusoidal patterns made up of reflected sinusoidal shapes, similar to that of weakened region 120. However, the pattern defined by tear seams 322 and 324 is distinct from the pattern defined by tear seams 332 and 334. More particularly, the sinusoids associated with tear seams 322 and 324 are lengthened with respect to the sinusoids associated with tear seams 332 and 334. In other words, the "wavelength" of each sinusoid pattern is greater in the bottom portion 325 than in the top portion 330.

As mentioned above, in certain preferred implementations of methods for manufacturing an airbag cover 300, use of vibratory knifes may provide sufficient control to allow for making such changes on the fly. This may allow for altering the weakening pattern as desired to fine tune the desired airbag deployment characteristics. In some embodiments and implementations, the various regions having differing tear seam or weakening pattern characteristics, such as top portion 330 and bottom portion 325 in FIG. 3, or at least a subset of such regions, may be connected with one another such that a vibratory knife need not be lifted during a transition from one such region to another such region. Thus, as can be seen in FIG. 3, the longer wavelengths of tear seams 322 and 324 are smoothly coupled to the shorter wavelengths of tear seams 332 and 334. In addition, the transition between bottom portion 325 and top portion 330 represents one example of how a radius of curvature of a line or tear seam of a weakening pattern may vary within the pattern.

Of course a variety of alternative options, features, and/or steps are contemplated. For example, in some embodiments and implementations, the pattern defined by tear seams 322 and 324 may be distinct from the pattern defined by tear seams 332 and 334 in other ways. For example, the "amplitude" of the pattern of one set of tear seams may be greater than the amplitude of another patter. In other words, the distance between opposing peaks of the pattern may be greater in one region of the weakening pattern than in another. In embodiments in which a linear tear seam 352 is formed within substrate 350, the distance between tear seam 352 and either of the opposing peripheries of the weakening pattern may be greater along one portion of the pattern than another. In implementations utilizing a vibratory knife, and particularly a CNC vibratory knife, again, the transition between the various regions may be made on the fly without lifting the knife from the cover 300. As still another alternative, in some embodiments and implementations, the depth of the cut associated with one region of weakening pattern 320 may differ from another region. For example, if it is desired to have a particular edge or portion of cover 300 open first, the depth of the cut of the weakening pattern 320 may be greatest in this region, and then may decrease along areas that are preferably separated later in the deployment process.

Figure 4:
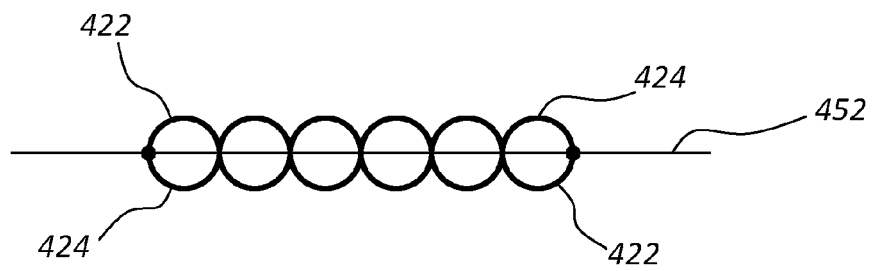
FIG. 4 is a close-up view of a weakening pattern comprising two overlapping tear seams for use in connection with some embodiments of covers for airbag cushions.

FIG. 4 illustrates a close-up view of a weakening pattern comprising tear seams 422 and 424 extending along a tear seam 452 that serves as a line of symmetry of tear seams 422 and 424. As previously mentioned, in some embodiments, tear seam 452 may be formed in one or more layers of material, such as a substrate, and the weakening pattern made up of tear seams 422 and 424 may be formed in one or more distinct layers of material making up an airbag cover, such as a leather decorative layer positioned adjacent to the substrate, for example.

As shown in FIG. 4, tear seam 422 comprises a first sinusoidal shape and tear seam 424 comprises a second sinusoidal shape having reflectional symmetry with respect to tear seam 422. In the depicted embodiment, tear seam 452 serves as not only an independent tear seam, but also as a line of symmetry for the above-referenced reflectional symmetry. In some implementations, a single knife blade, such as preferably a vibratory knife, may be used to form both tear seam 422 and 424. For example, in some implementations, a vibratory knife blade may form tear seam 422 in one direction and then reverse course to form tear seam 424 in the opposite direction. In some such implementations, this process may be performed without lifting the knife blade from the material in which tear seams 422 and 424 are being formed.

In other implementations, two or more separate blades may be used. Thus, for example, a first blade may be used to form tear seam 422 and a second blade may be used to form tear seam 424, either simultaneously or sequentially. In some embodiments and implementations, at least one line or tear seam of the weakening pattern may lack any sharp angles. In some such embodiments and implementations, all of the lines and/or tear seams in the weakening pattern may lack any sharp angles. This may improve the ability of the weakening pattern to avoid read through.

Figure 5:
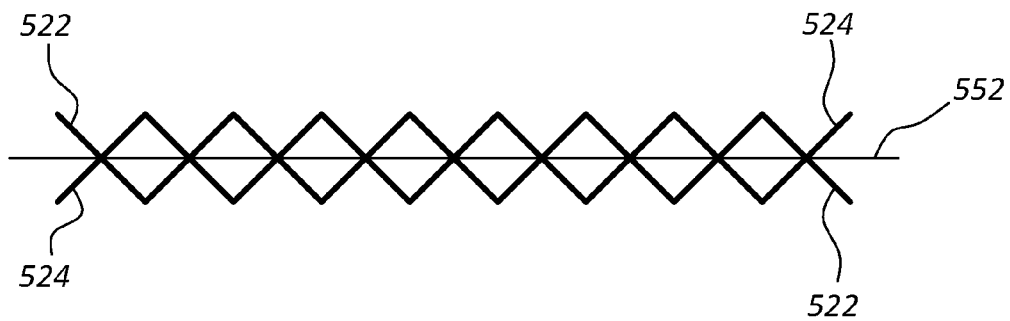
FIG. 5 is a close-up view of an alternative weakening pattern comprising two overlapping tear seams for use in connection with some embodiments of covers for airbag cushions.

However, other embodiments are contemplated and, for some applications, may be viable, which comprise weakening patterns having sharp angles. For example, the weakening pattern depicted in FIG. 5 comprises a first tear seam 522 and a second tear seam 524. Like the pattern depicted in FIG. 4, tear seam 522 has reflectional symmetry with respect to tear seam 524. However, unlike the pattern depicted in FIG. 4, both tear seams 522 and 524 comprise lines having sharp angles such that each of the respective tear seams defines a "zig-zag" pattern extending back and forth across tear seam 552, which, again, may be formed in a separate piece of material of the cover, such as a substrate.

Figure 6:
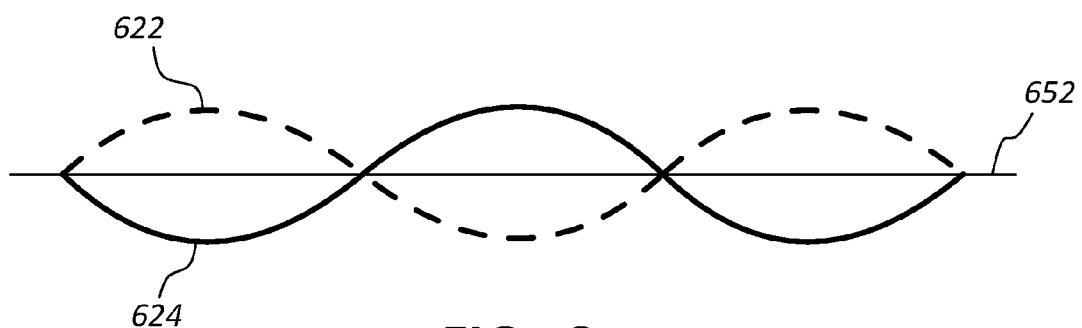
FIG. 6 is a close-up view of yet another weakening pattern comprising two overlapping tear seams for use in connection with some embodiments of covers for airbag cushions.

FIG. 6 depicts yet another example of a weakening pattern according to some embodiments and implementations. The weakening pattern of FIG. 6 again comprises two tear seams, namely, tear seam 622 and tear seam 624, that extend back and forth across an at least substantially linear tear seam 652. However, the weakening pattern of FIG. 6 differs from those of FIGS. 4 and 5 in that one of the tear seams (tear seam 622) comprises a tear seam defined by a series of spaced cuts rather than a continuous cut. The other tear seam of the pattern (tear seam 624) comprises a continuous cut, as previously described. Of course, other embodiments are contemplated in which both tear seams 622 and 624, or at least a portion of both tear seams, comprise intermittent or spaced cuts, if desired.

Figure 7:
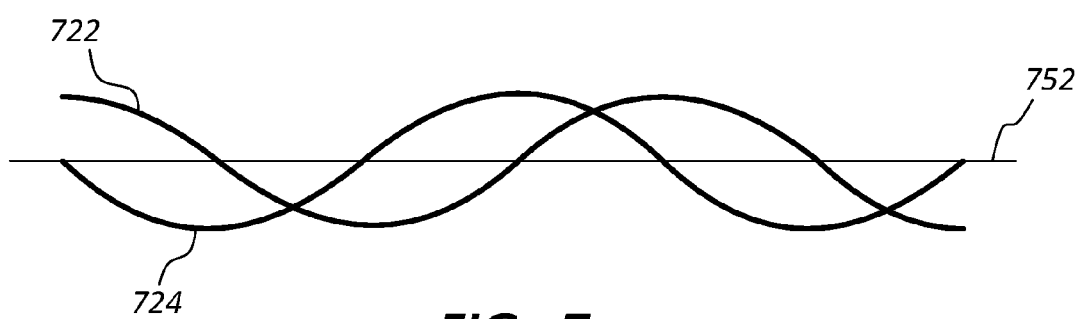
FIG. 7 is a close-up view of still another weakening pattern comprising two overlapping tear seams for use in connection with some embodiments of covers for airbag cushions.

FIG. 7 depicts still another example of a weakening pattern according to some embodiments and implementations. The weakening pattern of FIG. 7 again comprises two tear seams, namely, tear seam 722 and tear seam 724, that extend back and forth across an at least substantially linear tear seam 752. However, the weakening pattern of FIG. 7 differs from the examples of the previous drawings in a few respects. Most notably, the shape of tear seam 722 is a shifted, reflected image of the shape of tear seam 724 but does not have reflectional symmetry with respect to the shape of tear seam 724. In addition, unlike the pattern of FIG. 6, in the pattern of FIG. 7 both tear seams 722 and 724 comprise continuous cuts. As mentioned above, in certain preferred embodiments, both of tear seams 722 and 724 comprise continuous cuts that only partially extend through a layer of a cover, such as layer 110 of cover 100.

The foregoing specification has been described with reference to various embodiments and implementations. However, one of ordinary skill in the art will appreciate that various modifications and changes can be made without departing from the scope of the present disclosure. For example, various operational steps, as well as components for carrying out operational steps, may be implemented in various ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Those having skill in the art will appreciate that many changes may be made to the details of the above-described embodiments without departing from the underlying principles of the invention. The scope of the present invention should, therefore, be determined only by the following claims.

The invention claimed is:

1. A cover for an airbag cushion, comprising:
a weakened region configured to facilitate separation of the cover during deployment of an airbag cushion, wherein the weakened region comprises:
a first tear seam comprising a first shape defined by a first line comprising at least one of regions of curvature and angled regions; and
a second tear seam comprising a second shape defined by a second line comprising at least one of regions of curvature and angled regions, wherein the first shape at least substantially comprises a reflected image of the second shape, and wherein the first shape comprises an unshifted, reflected image of the second shape such that the first shape has reflectional symmetry with respect to the second shape.

2. The cover of claim 1, wherein the cover further comprises a substrate, wherein the substrate comprises a substrate tear seam, and wherein the first shape has reflectional symmetry with respect to the second shape about a line of symmetry defined by the substrate tear seam.

3. The cover of claim 1, wherein the first line lacks any sharp angles, and wherein the second line lacks any sharp angles.

4. The cover of claim 3, wherein the first shape comprises a first sinusoidal wave pattern, and wherein the second shape comprises a second sinusoidal wave pattern reflected with respect to the first sinusoidal wave pattern.

5. The cover of claim 3, wherein a radius of curvature of the first line varies within the first shape, and wherein a radius of curvature of the second line varies within the second shape.

6. The cover of claim 3, wherein a radius of curvature of the first line is at least 0.5 mm along an entire length of the first line, and wherein a radius of curvature of the second line is at least 0.5 mm along an entire length of the second line.

7. The cover of claim 1, wherein the cover comprises a leather material, and wherein the weakened region is formed in the leather material.

8. The cover of claim 7, wherein the cover further comprises a substrate positioned adjacent to the leather material.

9. The cover of claim 8, wherein the weakened region is further formed in the substrate.

10. A method for manufacturing an airbag cushion cover, the method comprising the steps of:
obtaining a first layer of an airbag cushion cover;
forming a first weakened pattern in the first layer such that the first weakened pattern facilitates separation of the first layer to allow for deployment of an airbag cushion therethrough,
wherein the first weakened pattern comprises a first shape;
forming a second weakened pattern in the first layer such that the second weakened pattern further facilitates separation of the first layer to allow for deployment of an airbag cushion therethrough,
wherein the second weakened pattern comprises a second shape, and wherein the second shape comprises a reflected image of the first shape;
coupling a second layer of the airbag cushion cover to the first layer; and
forming a tear seam in the second layer, wherein the tear seam is positioned in between the first weakened pattern and the second weakened pattern.

11. The method of claim 10, wherein the first shape comprises a first sinusoidal wave pattern, wherein the second shape comprises a second sinusoidal wave pattern, and wherein the first sinusoidal wave pattern has reflectional symmetry with respect to the second shape about a line of symmetry.

12. The method of claim 11, wherein the line of symmetry coincides with the tear seam.

* * * * *